United States Patent
Moriya et al.

(10) Patent No.: US 10,203,555 B2
(45) Date of Patent: Feb. 12, 2019

(54) PROCESS FOR PRODUCING A PHASE DIFFERENCE CONTROL COMPONENT AND LIQUID CRYSTAL DISPLAY DEVICE

(71) Applicant: Dai Nippon Printing Co., Ltd., Tokyo (JP)

(72) Inventors: Norihisa Moriya, Tokyo (JP); Kanami Ikegami, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 15/092,933

(22) Filed: Apr. 7, 2016

(65) Prior Publication Data

US 2016/0223847 A1  Aug. 4, 2016

Related U.S. Application Data

(60) Continuation of application No. 12/365,402, filed on Feb. 4, 2009, now abandoned, which is a division of
(Continued)

(30) Foreign Application Priority Data

Jul. 7, 2004 (JP) .................................. 2004-200786
Jul. 4, 2005 (JP) .................................. 2005-194678

(51) Int. Cl.
*G02F 1/13363* (2006.01)
*G02B 5/30* (2006.01)
*G02F 1/1337* (2006.01)

(52) U.S. Cl.
CPC ....... *G02F 1/13363* (2013.01); *G02B 5/3016* (2013.01); *G02F 1/133711* (2013.01);
(Continued)

(58) Field of Classification Search
CPC ...... G02B 5/3016; G02B 5/3038; G02B 5/32; C08J 5/18; G02F 1/13363;
(Continued)

(56) References Cited

U.S. PATENT DOCUMENTS 5,560,864 A  10/1996 Goulding
5,798,147 A  8/1998 Beck et al.
(Continued)

FOREIGN PATENT DOCUMENTS

JP  07-258638 A1  10/1995
JP  08-015681 A1   1/1996
(Continued)

*Primary Examiner* — Ruiyun Zhang
(74) *Attorney, Agent, or Firm* — Burr & Brown, PLLC

(57) ABSTRACT

There are provided a phase difference control component, which can realize a liquid crystal display device having a wide angle of visibility, has excellent phase difference symmetry and can realize optical compensation, and a process for producing the same. The phase difference control component comprises a base material; and a phase difference control layer formed of a fixed liquid crystal material provided on the base material through an aligning film and is characterized in that the angle of liquid crystal molecules, present at the interface of the aligning film and the phase difference control layer, to the base material being substantially 0 (zero) degree.

16 Claims, 4 Drawing Sheets

Related U.S. Application Data application No. 11/175,959, filed on Jul. 6, 2005, now abandoned.

(52) U.S. Cl.
CPC ............... *G02F 1/133788* (2013.01); *G02F 2001/133633* (2013.01); *G02F 2001/133749* (2013.01); *Y10T 428/10* (2015.01); *Y10T 428/1005* (2015.01); *Y10T 428/1036* (2015.01)

(58) Field of Classification Search
CPC ......... G02F 1/133711; G02F 1/133788; G02F 2001/133633; G02F 2001/133638; G02F 2001/133738; Y10T 428/10; Y10T 428/1005; Y10T 428/1036; Y10T 428/105
USPC ............... 428/1.1, 1.2, 1.25, 1.26, 1.3, 1.33; 349/117, 118, 123; 359/489.07
See application file for complete search history.

(56) References Cited

U.S. PATENT DOCUMENTS

| | | | |
|---|---|---|---|
| 5,926,241 A | 7/1999 | Gunning, III | |
| 6,115,095 A | 9/2000 | Suzuki et al. | |
| 6,160,597 A * | 12/2000 | Schadt ................ | C08F 246/00 349/98 |
| 6,519,016 B1 | 2/2003 | Ichihashi et al. | |
| 6,982,774 B1 | 1/2006 | Nomura et al. | |
| 7,158,200 B2 | 1/2007 | Kuzuhara et al. | |
| 7,199,848 B2 | 4/2007 | Kuzuhara et al. | |
| 7,359,018 B2 | 4/2008 | Kashima | |
| 2002/0012090 A1 | 1/2002 | Lee et al. | |
| 2002/0080485 A1 | 6/2002 | Suzuki et al. | |
| 2004/0017532 A1 | 1/2004 | Ishikawa et al. | |
| 2004/0233362 A1 | 11/2004 | Kashima | |
| 2004/0257489 A1 | 12/2004 | Gotoh et al. | |
| 2006/0193999 A1 | 8/2006 | Verall et al. | |
| 2006/0244884 A1 | 11/2006 | Jeon et al. | |

FOREIGN PATENT DOCUMENTS

| | | |
|---|---|---|
| JP | 10-161126 A1 | 6/1998 |
| JP | 11-133408 A1 | 5/1999 |
| JP | 11-153712 A1 | 6/1999 |
| JP | 2002-062427 A1 | 2/2002 |
| JP | 2002-182158 A1 | 6/2002 |
| JP | 2002-236216 A1 | 8/2002 |
| JP | 2002-268068 A1 | 9/2002 |
| JP | 2003-073562 A1 | 3/2003 |
| JP | 2003-270638 A1 | 9/2003 |
| JP | 2004-094219 A1 | 3/2004 |
| JP | 2004-109171 A1 | 4/2004 |
| JP | 2004-110003 A1 | 4/2004 |

* cited by examiner

PROCESS FOR PRODUCING A PHASE DIFFERENCE CONTROL COMPONENT AND LIQUID CRYSTAL DISPLAY DEVICE

CROSS REFERENCE TO RELATED APPLICATIONS

This application is a continuation of U.S. application Ser. No. 12/365,402 filed Feb. 4, 2009, which in turn is a division of U.S. application Ser. No. 11/175,959, now abandoned, filed Jul. 6, 2005, the entireties of which are incorporated herein by reference.

BACKGROUND OF THE INVENTION

Field of the Invention

The present invention relates to a phase difference control component comprising a liquid crystal material, which has excellent symmetry with respect to the angle of visibility and is optically compensable, and a process for producing the same, and a liquid crystal display device comprising said phase difference control component.

Background Art

Color liquid crystal displays (hereinafter often referred to as "LCDs") have features such as thin shape, light weight, low power consumption, and flickerless, and the market of color liquid crystal displays for PCs including notebook computers has been rapidly grown. In recent years, regarding displays for PCs, there is an increasing demand for desktop monitors which are larger in size than notebook computers. Further, LCDs have become utilized in PCs, as well as in TVs for which CRTs have hitherto been mainly utilized.

A small angle of visibility is a problem inherent in LCDs. This problem is caused by light leakage from pixels, which should originally display black, when LCDs are viewed in an oblique direction. Due to this light leakage, the inversion of contrast takes place, and proper display becomes impossible. As a result, the angle of visibility is lowered.

In order to solve the above problem, LCDs with a high angle of visibility using a phase difference film have been proposed. The phase difference film is also used in combination with a linear polarization plate for creating various polarized states. For example, circularly polarized light can generally be constituted by a combination of a linearly polarizing plate with a λ/4 (quarter-wave) phase difference plate.

In these phase difference films, transparent polymeric films such as polycarbonate films subjected to stretching treatment such as monoaxial stretching have hitherto been used. In addition to these films, films formed by aligning and fixing a liquid crystal material having refractive index anisotropy while imparting given regularity can also be used. The phase difference film using a liquid crystal material can constitute, through alignment control of liquid crystal molecules, positive and negative A plates, positive and negative C plates, and a phase difference layer with hybrid alignment in which the aligned state is continuously varied (see, for example, Japanese Patent Laid-Open No. 11-153712 A1).

An aligning film subjected to alignment treatment is necessary for horizontally aligning liquid crystal molecules against a base material in a monoaxial direction. In general, polyimide films subjected to rubbing treatment are generally used as the aligning film. When liquid crystal molecules are aligned in a rubbing direction on the aligning film subjected to rubbing treatment, a pretilt angle (an angle of liquid crystal molecules to the base material) is created so that the end of the liquid crystal molecules are lifted in the rubbing direction relative to the base material. This pretilt angle plays an important role in regulating the liquid crystal molecules so that, upon voltage application, the liquid crystal molecules are lifted unidirectionally. Therefore, the presence of a pretilt angle in the liquid crystal molecules is indispensable, and, at the same time, the pretilt angle should be controlled.

When a fixed liquid crystal material is used as the phase difference control component, however, the presence of a pretilt angle in liquid crystal molecules causes a change in the level of phase difference to become asymmetrical with respect to the vertical direction upon a change in angle of visibility in a direction other than the phase advance axis. In particular, when the angle of visibility is varied in an optical axis direction of liquid crystal molecules, the asymmetry of a change in level of the phase difference is most significant.

Specifically, in the formation of an aligning film by the conventional rubbing method, as shown in FIG. 2, an aligning film 22 is coated on a base material 21 (FIG. 2(a)). The aligning film is rubbed, for example, by a rubbing roller 23 or the like (FIG. 2(b)). Next, a liquid crystal material is coated on the aligning film subjected to rubbing treatment. Molecular liquid crystals 24 make a pretilt angle θ with the direction of rotation of the rubbing roller 23 for alignment (FIG. 2(c)).

For this reason, when the level of phase difference is measured by varying the observation angle in a direction other than the phase advance axis, the level of the phase difference is asymmetrical with respect to 0 (zero) degree (vertical direction). In particular, when the level of phase difference is measured by varying the observation angle in the direction of the slow phase axis, the asymmetry of the level of the phase difference is most significant. For this reason, a liquid crystal display device to which a phase difference control component formed of a liquid crystal material with a pretilt angle θ has been applied, suffers from a problem that, except for a change in observation angle in the phase advance axis, display images are different.

Since the pretilt angle also propagates in the thicknesswise direction of the film, when the phase difference layer comprises a plurality of liquid crystal layers stacked on top of each other, the alignment at the interface of the liquid crystal layers is adversely affected.

For oblique compensation of angle of visibility, the necessary phase difference level should be calculated for design of the phase difference control component. When the level of the symmetry of the angle of visibility is low, a desired phase difference level can be realized only in any one direction and a phase difference control component, which can realize a satisfactorily large angle of visibility, cannot be provided.

In large-size liquid crystal televisions, due to properties of angle of visibility within a display face attributable to the large area, the symmetry of the angle of visibility poses a severe problem.

SUMMARY OF THE INVENTION

The present inventors have now found that, when the pretilt angle of liquid crystal molecules constituting a phase difference control component is substantially 0 (zero) degree, the asymmetry of the phase difference does not occur. The present invention has been made based on such finding.

Accordingly, an object of the present invention is to provide a phase difference control component, which has excellent phase difference symmetry and is optically compensable, capable of realizing a liquid crystal display device having a wide angle of visibility, and a process for producing the same.

The phase difference control component according to the present invention comprises: a base material; and a phase difference control layer formed of a fixed liquid crystal material provided on said base material through an aligning film, characterized in that the angle of liquid crystal molecules, present at the interface of the aligning film and the phase difference control layer, to the base material is substantially 0 (zero) degree.

The process for producing a phase difference control component according to the present invention is characterized by comprising at least the steps of:

forming an aligning film on a base material; and providing a liquid crystal material on said aligning film and applying alignment controlling force to the liquid crystal material to form a phase difference control layer, the application of the alignment controlling force to the liquid crystal material being carried out by a photoalignment method in which collimated deflected light is applied to the alignment film from the vertical direction.

In the present invention, the expression "a pretilt angle of substantially 0 degree" means that, although, when liquid crystal molecules are microscopically observed, the liquid crystal molecules are very slightly tilted against the base material surface, since there is no regularity in the direction of lifting of the tilt, when the liquid crystal molecules are macroscopically observed, lifting angles are offset and, consequently, the pretilt angle is observed to be 0 degree.

In the phase difference control component according to the present invention, any pretilt angle does not exist in the liquid crystal molecules constituting the phase difference member. Therefore, the level of the phase difference symmetry is so high that the angle of visibility of the liquid crystal display device can be effectively increased. Further, a liquid crystal display device, which is excellent in symmetry of the angle of visibility, can be realized.

Further, in the process according to the present invention, in constructing a phase difference control component using a liquid crystal material, a phase difference layer having a pretilt angle of substantially 0 degree can be formed by using a photoalignment method and applying ultraviolet light in the vertical direction. Therefore, when the level of phase difference is measured by varying the observation angle in the slow phase axis direction, highly symmetrical phase difference control can be realized and, thus, a phase difference control component which can realize higher-accuracy optical compensation can be provided.

Further, according to the present invention, when the phase difference control component is stacked directly on a color filter, a higher-performance phase difference control component free from shrinkage with the elapse of time and peel-off which are problems of the conventional film-type phase difference control component can be provided.

DETAILED DESCRIPTION OF THE INVENTION

Embodiments of the present invention will be described in detail with reference to the accompanying drawings.

The phase difference control component according to the present invention has a structure comprising a phase difference control layer provided on a base material through an aligning film. Individual layers constituting the phase difference control component according to the present invention will be descried.

Base Material

Figure 1:
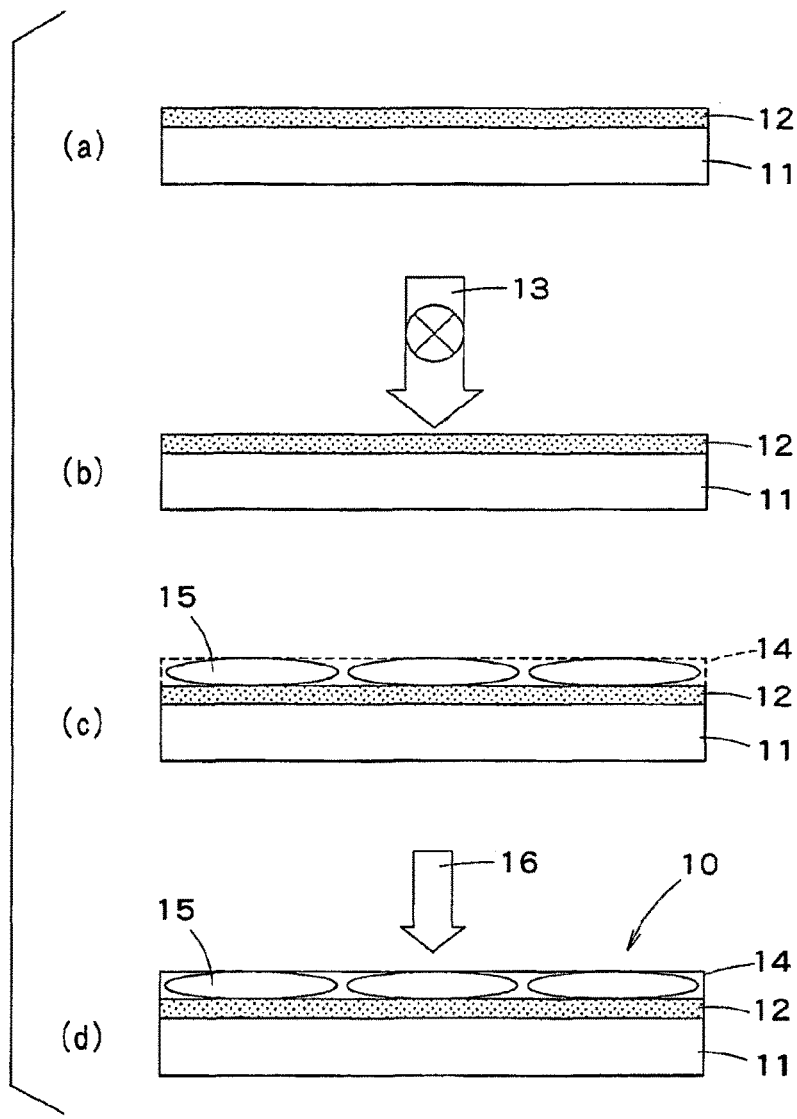
FIG. 1 is a cross-sectional view illustrating a production process of a phase difference control component comprising a liquid crystal material by a photoalignment method according to the present invention.
Figure 2:
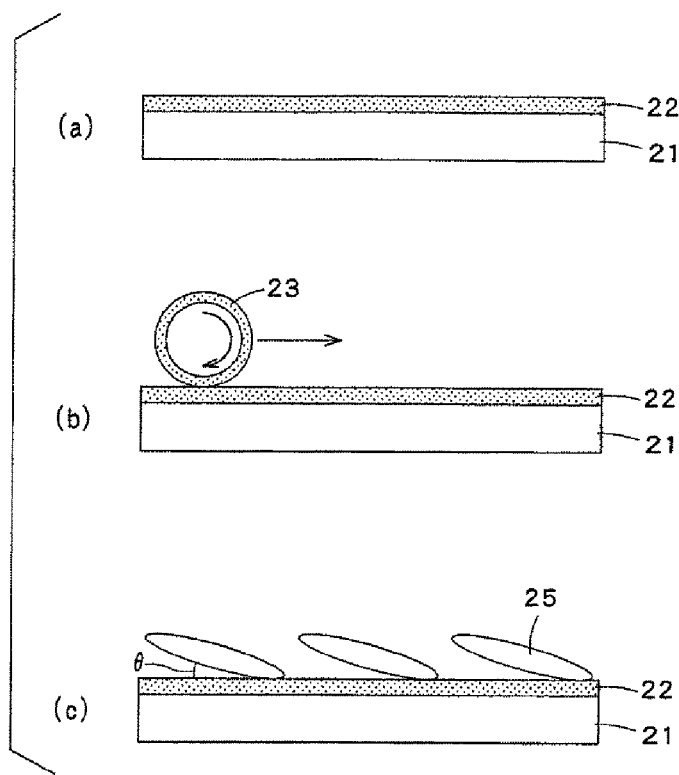
FIG. 2 is a cross-sectional view illustrating the step of aligning an aligning film by the conventional rubbing method.
Figure 3:
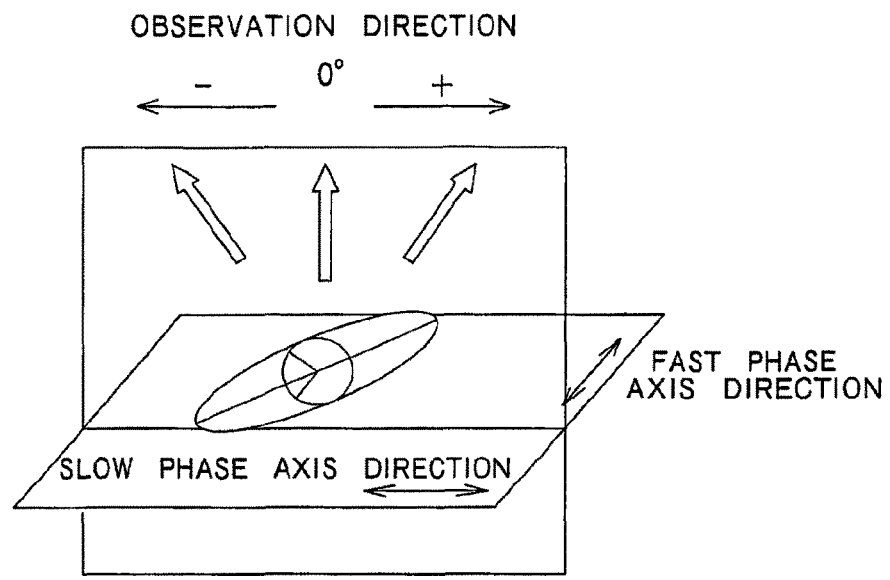
FIG. 3 is an explanatory view illustrating the case where the level of the phase difference is measured by varying the observation angle in the slow phase axis direction to positive values and negative values relative to 0 degree.

As shown in FIG. 1(a), a base material 11 on which an aligning film 12 is provided is either an inorganic base material, for example, a glass substrate formed of glass or quartz or silicon, or an organic base material.

Organic base materials include plastic substrates or films formed of polymethyl methacrylate or other acrylic resins, polyamides, polyacetals, polybutylene terephthalates, polyethylene terephthalates, polyethylene naphthalates, triacetylcelluloses, syndiotactic polystyrenes, polyphenylene sulfides, polyether ketones, polyether ether ketones, fluororesins, polyethernitriles, polycarbonates, modified polyphenylene ethers, polycyclohexenes, polynorbornenes resins, polysulfones, polyethersulfones, polysulfones, polyallylates, polyamide-imides, polyetherimides or thermoplastic polyimides. However, it should be noted that the organic base material is not limited to those described above and conventional plastic films and the like may also be used.

Further, the above-described glass substrates, plastic substrates and substrates comprising a color filter provided on a film may also be used as the base material.

The thickness of the base material 11 is not particularly limited and may vary depending upon applications, and, for example, base material having a thickness of about 1 nm to 5 μm may be used.

A substrate provided with a color filter may also be used as the base material. For example, a construction may also be adopted in which an aligning film is provided on a color filter and a phase difference control layer formed of a liquid crystal material is then stacked.

Aligning Film

The aligning film used in the present invention may be formed by the following method. A solution of an aligning film material dissolved in a solvent is prepared. This solution is coated onto the base material 11 by spin coating, flexographic printing or the like to form a coating film. Thereafter, the solvent is removed from the coating film to form an unaligned aligning film. Next, the aligning film is subjected to alignment treatment. Alignment methods usable in the present invention for bringing the pretilt angle of liquid crystal molecules to substantially 0 degree include photoalignment, and rubbing treatment for aligning liquid crystal molecules in a direction perpendicular to the rubbing direction.

FIG. 1(b) shows the step of subjecting an aligning film to a photoalignment to alignment treatment. Specifically, collimated polarized light (ultraviolet light) 13 is applied to the aligning film 12 provided on the base material 11 for alignment of the aligning film 12 by photoalignment. In the present invention, alignment methods using the photoalignment are roughly divided into photoisomerization types and photoreaction types according to the reaction mechanism. Photoreaction types are further subdivided into dimerization types, decomposition types, bonding types and the like.

One example of the photoisomerization type is azobenzene which causes cis-trans isomerization. Azobenzene absorbs ultraviolet light of an electric field vector parallel to the molecular axis and consequently is converted from trans form to cis form. Liquid crystal molecules are aligned parallel to azobenzene in trans form and thus are aligned in a direction perpendicular to the polarization direction of ultraviolet light. Accordingly, an aligning film having a pretilt angle of substantially 0 degree can be prepared.

Photoreaction types include dimerization of polyvinyl cinnamate, decomposition of polyimide resin, and bonding of polyimide having a benzophenone skeleton. All of these methods can form aligning films having a pretilt angle of 0 degree.

A rubbing technique for aligning liquid crystal molecules in a direction vertical to the rubbing direction may be mentioned as another alignment method for bringing the pretilt angle of liquid crystal molecules to substantially 0 degree.

For example, conventional aligning films disclosed in Japanese Patent Laid-Open Nos. 2002-062427 A1 and 2002-268068 A1 may be used as the aligning film in this method. Specifically, aligning films, in which the pretilt angle of liquid crystal molecules is substantially 0 degree, can be prepared by using modified polyvinyl alcohols or polyimide or polyamic acid having a carbazole skeleton on its side chain.

Phase Difference Control Layer

In the present invention, the phase difference control layer 14 provided on the aligning film 12 is formed of a liquid crystal material. After the alignment treatment, the liquid crystal material should be fixed while maintaining the alignment. FIG. 1(c) shows a phase difference control layer 14 in such a state that liquid crystal molecules 15 have been aligned to a pretilt angle of substantially 0 degree. In the drawing, the liquid crystal molecules 15 are shown in a typically enlarged state.

Subsequently, the liquid crystal material is fixed while holding the alignment of the liquid crystal molecules 15. In this case, from the above viewpoint, preferred liquid crystal materials include polymeric liquid crystal materials, which have a glass transition temperature and, at a temperature below the glass transition temperature, can realize fixation of the liquid crystal structure, and photopolymerizable liquid crystal materials which can be cured by three-dimensional crosslinking upon exposed to ultraviolet light.

Monomer molecules which are three-dimensionally crosslinkable upon exposure to ultraviolet light include a mixture of a liquid crystal monomer and a chiral compound, as disclosed, for example, in Japanese Patent Laid-Open No. 07-258638 A1 and Published Japanese Translation of PCT Publication No. 10-508882 T. For example, compounds represented by the following formulae (I) to (XI) or a mixture composed of two or more of them are suitable for use as the photopolymerizable liquid crystal material. In the liquid crystal monomer represented by formula (XI), preferably, X is 2 to 5 (integer).

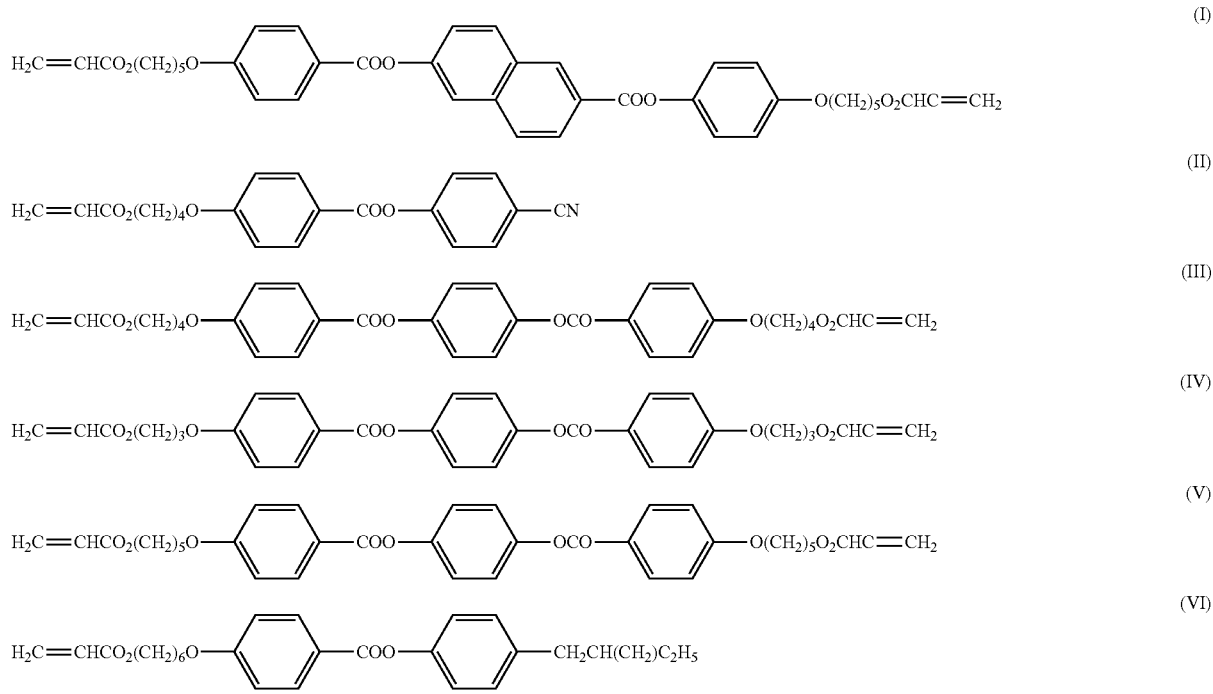

-continued

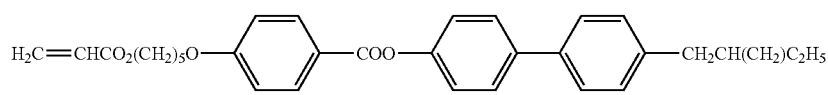
(VII)

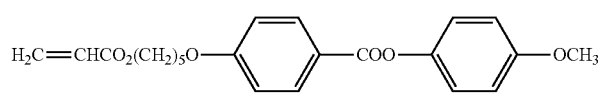
(VIII)

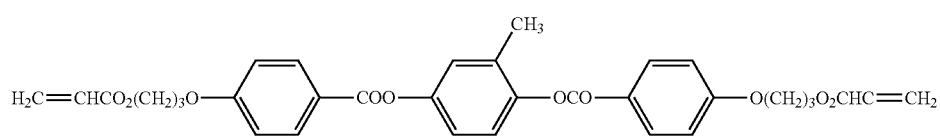
(IX)

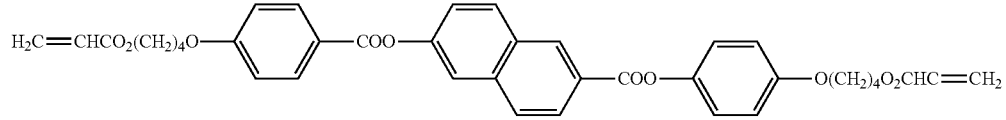
(X)

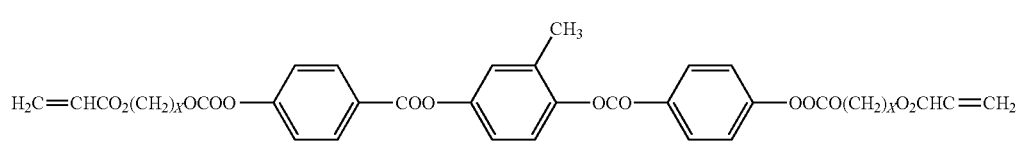
(XI)

Compounds having chemical structures represented by the following formulae (XII) to (XIV) are suitable as chiral agents.

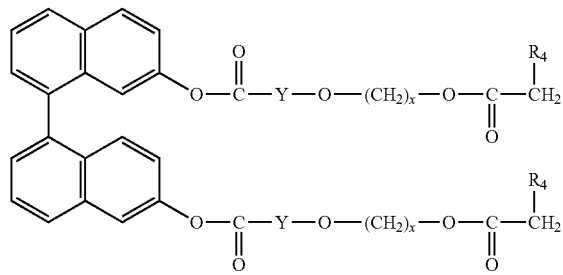
(XII) (XIII)

(XIV)

In the chiral agents represented by formulae (XII) to (XIII), Y represents any one substituent selected from substituents represented by the following formulae (i) to (xxiv), and $R_4$ represents hydrogen or a methyl group. X is preferably 2 to 12 (integer).

In the chiral agent represented by formula (XIV), X is preferably 2 to 5 (integer).

(i)

(ii)

(iii)

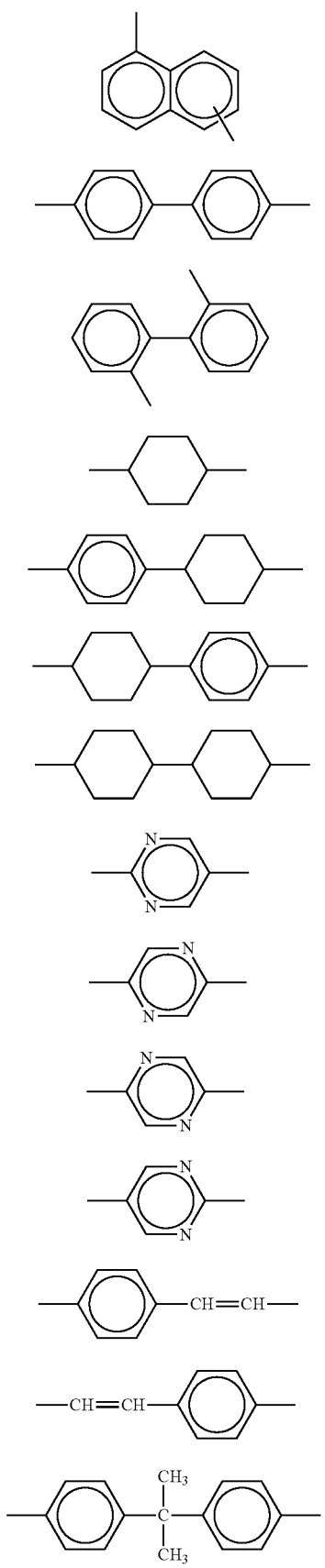
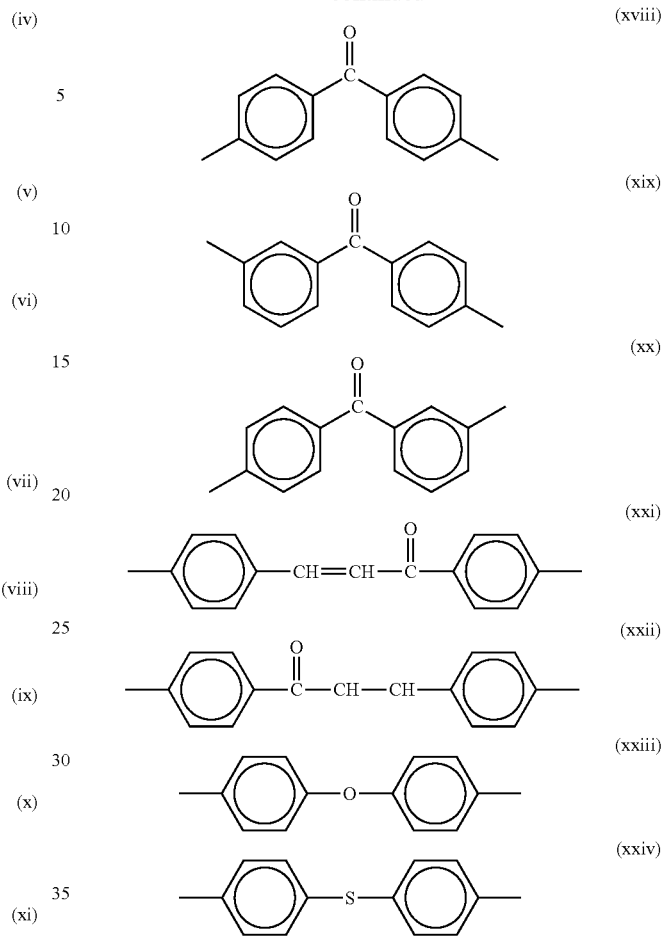

The phase difference control layer 14 may be formed by providing the above photopolymerizable liquid crystal material or polymeric liquid crystal material, optionally dissolving or diluting the material with a solvent, coating the material onto a base material by spin coating, die coating, slit coating or other proper method, and removing the residual solvent, for example, by heat drying. Thereafter, a liquid crystal structure in which liquid crystal molecules have been aligned at a pretilt angle of substantially 0 degree is developed in the liquid crystal material.

When a photopolymerizable liquid crystal material is used, as shown in FIG. 1(d), ultraviolet light 16 is then applied to polymerize the photopolymerizable liquid crystal material, whereby a phase difference control layer 14 formed of a liquid crystal material, which holds a liquid crystal structure with liquid crystal molecules aligned at a pretilt angle of substantially 0 degree, can be formed.

In the present invention, preferably, the phase difference control layer has positive birefringence properties, and the optical axis thereof is parallel to the plane of the phase difference control layer.

In the present invention, a two-layer construction may also be adopted in which a second phase difference control layer, which has negative birefringence properties and has an optical axis perpendicular to the plane of the phase difference control component is stacked on the phase difference control layer which has positive birefringence properties and has an optical axis parallel to the plane of the phase difference control component.

Further, in the present invention, another two-layer construction may also be adopted in which a second phase difference control layer, which has positive birefringence properties and has an optical axis perpendicular to the plane of the phase difference control layer is stacked on a first phase difference control layer which has positive birefringence properties and has an optical axis parallel to the plane of the phase difference control layer.

The phase difference control component according to the present invention, together with a color filter, may constitute a laminate structure. For example, when a phase difference control layer having an optical axis parallel to the plane of the phase difference control layer is stacked on a color filter, a method may be adopted in which a photopolymerizable liquid crystal composition comprising a photopolymerization initiator incorporated in a polymerizable liquid crystal monomer is coated onto one side of a color filter to form a coating which is then exposed to ultraviolet light or the like to form a continuous one layer stacked on the color filter. On the other hand, when a phase difference control layer having an optical axis perpendicular to the plane of the phase difference control layer is stacked, this layer can be formed in the same manner as described above, except that a photopolymerizable liquid crystal composition containing a polymerizable chiral agent is used.

The laminate structure in which the phase difference control component is stacked directly on the color filter can realize a high-performance phase difference control component free from shrinkage with the elapse of time and peeling which are problems of the conventional film-type phase difference control component.

In forming the phase difference control component on the color filter, in some cases, the underlying color filters are different from each other in thickness depending upon color patterns of red, blue, and green, that is, the surface of the color filters is uneven. In this case, preferably, a method is adopted in which the color filter is flattened by providing a transparent flattening layer on the color filter and the phase difference control component is then formed on the flattening layer.

Further, in an embodiment of the present invention, a color filter is stacked on a phase difference control component.

Examples

The following Examples further illustrate the present invention. However, it should be noted that the present invention is not limited to these Examples.
1. Preparation of Base Material with Aligning Film A glass substrate (1737 glass, manufactured by Corning Inc.) which had been cleaned by a predetermined method was provided as a base material, and AL 1254 (manufactured by JSR Corporation) was provided as an aligning film material. The aligning film material was coated by flexographic printing onto the glass substrate to form a 600 angstrom-thick aligning film.

Next, polarized ultraviolet light was applied to the aligning film at 5 J/cm$^2$ in a direction vertical to the base material to form an aligning film by a photoalignment method to which monoaxial anisotropy had been imparted.

For comparison, a base material provided with an aligning film subjected to the conventional rubbing treatment was prepared.
2. Preparation of Ink for Phase Difference Control Layer Ultraviolet-curable acrylate group-containing RMM 34 (manufactured by Merck & Co., Inc.) was used as a liquid crystal material for phase difference control layer formation. 20 parts by weight of RMM 34 was dissolved in propylene glycol monomethyl ether acetate as a solvent to prepare a composition for phase difference control layer formation.
3. Formation of Phase Difference Control Layer Next, the composition for phase difference control layer formation prepared above was spin coated onto the base material with the aligning film formed thereon by the photoalignment method. For comparison, the same composition was coated on the base material with the aligning film formed thereon by the rubbing method.

Both the substrates with the composition coated thereon were heated on a hot plate at 100° C. for 5 min to remove the residual solvent and thus to develop a liquid crystal structure. Next, ultraviolet light was applied (500 mJ/cm$^2$, 365 nm) to fix the liquid crystal structure and thus to form a phase difference control layer.

Thus, phase difference control components comprising a phase difference control layer provided on a base material through an aligning film were prepared.
4. Measurement of Level of Phase Difference in Phase Difference Control Component Next, for the phase difference control components, retardation values (Re; nm) representing the level of phase difference were measured by varying the observation angle (an elevation angle) in the range of −45 degrees to +45 degrees in the slow phase axis direction. RETS-3100 VA, manufactured by Otsuka Electronics Co., Ltd. was used for the measurement. The results of measurement are shown in FIGS. 4 and 5.

Figure 4:
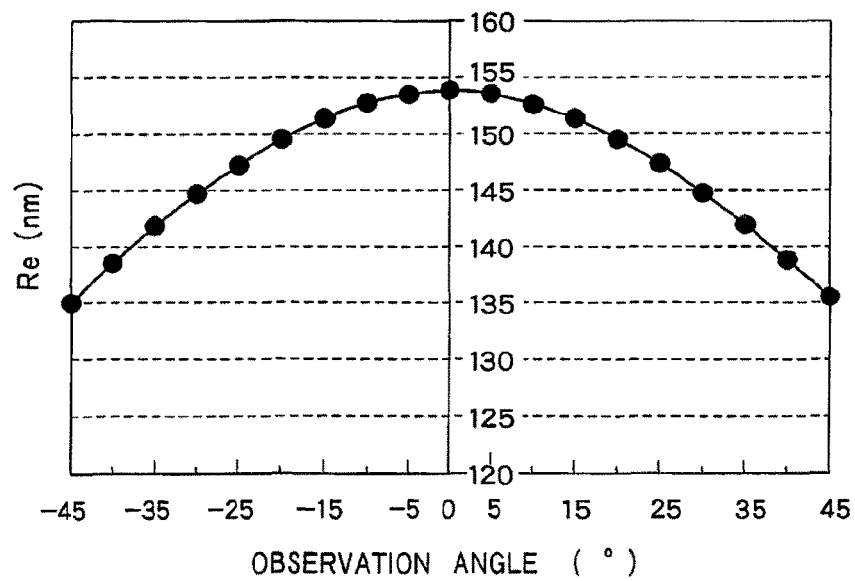
FIG. 4 is a diagram showing the results of measurement of retardation values (Re; nm) representing the level of phase difference by varying the observation angle (an elevation angle) of a phase difference control component in the working example in the range of −45 degrees to +45 degrees in the slow phase axis direction.
Figure 5:
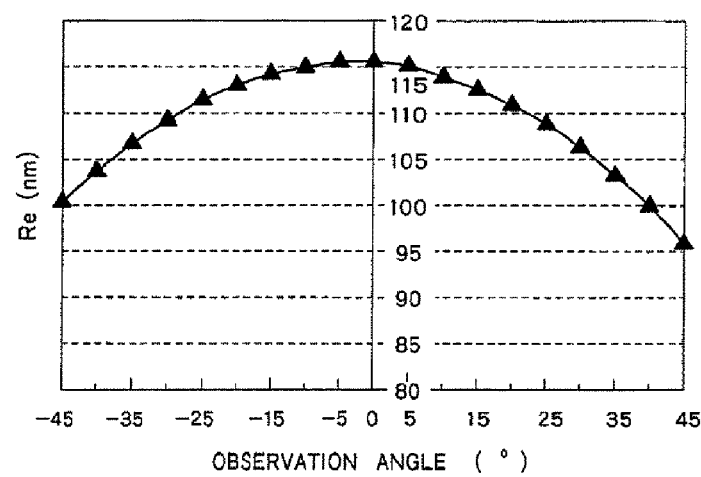
FIG. 5 is a diagram showing the results of measurement of retardation values (Re in nm) representing the level of phase difference by varying the observation angle (an elevation angle) of a phase difference control component in the range of −45 degrees to +45 degrees in the slow phase axis direction by the conventional rubbing method for comparison with the working examples of the present invention.

FIG. 4 shows the results of measurement for the phase difference control component according to the present invention prepared by forming an aligning film by photoalignment and providing a phase difference control layer formed of a liquid crystal material on the aligning film. FIG. 5 shows the results of measurement for the comparative phase difference control component prepared by forming an aligning film by the conventional rubbing method and providing a phase difference control layer formed of a liquid crystal material on the aligning film.

In the case of the photoalignment method shown in FIG. 4, phase difference properties are symmetrical with respect to the angle of visibility. On the other hand, as can be seen from FIG. 5, in the case of the aligning film formed by the rubbing method, phase difference properties are asymmetrical. These results show that, in the phase difference control component according to the present invention prepared by the photoalignment method, bringing the pretilt angle of liquid crystal molecules constituting the phase difference layer to substantially 0 degree can realize a high level of symmetry of the phase difference and an effective increase in angle of visibility.

Further, a liquid crystal display device prepared using the phase difference control component by the photoalignment method according to the present invention shown in FIG. 4 exhibited display which was excellent in symmetry of the angle of visibility.

The invention claimed is:
1. A phase difference control component comprising:
a base material; and
a phase difference control layer formed of a fixed liquid crystal material provided on said base material through a photo-aligned aligning film, the photo-aligned aligning film being capable to develop a liquid crystal structure in which liquid crystal molecules, present at the interface of the photo-aligned aligning film and the phase difference control layer, have been aligned at a pretilt angle of substantially 0 degree, wherein the photo-aligned aligning film is formed by irradiating polarized light vertically to the surface of the photo-aligned aligning film, and wherein the photo-aligned aligning film is photodimerization type formed of polyvinyl cinnamate.

2. The phase difference control component according to claim 1, wherein said phase difference control layer has positive birefringence properties and the optical axis thereof is parallel to the plane of the phase difference control layer.

3. The phase difference control component according to claim 1, wherein the retardation value of said phase difference control component representing the level of phase difference, measured by varying the observation angle in the range of −45 degrees to +45 degrees in the slow phase axis direction, is symmetrical with respect to the observation angle.

4. The phase difference control component according to claim 1, wherein the liquid crystal material comprises a three-dimensionally crosslinkable compound upon exposure to ultraviolet light selected from the group consisting of formulae (I) to (XI):

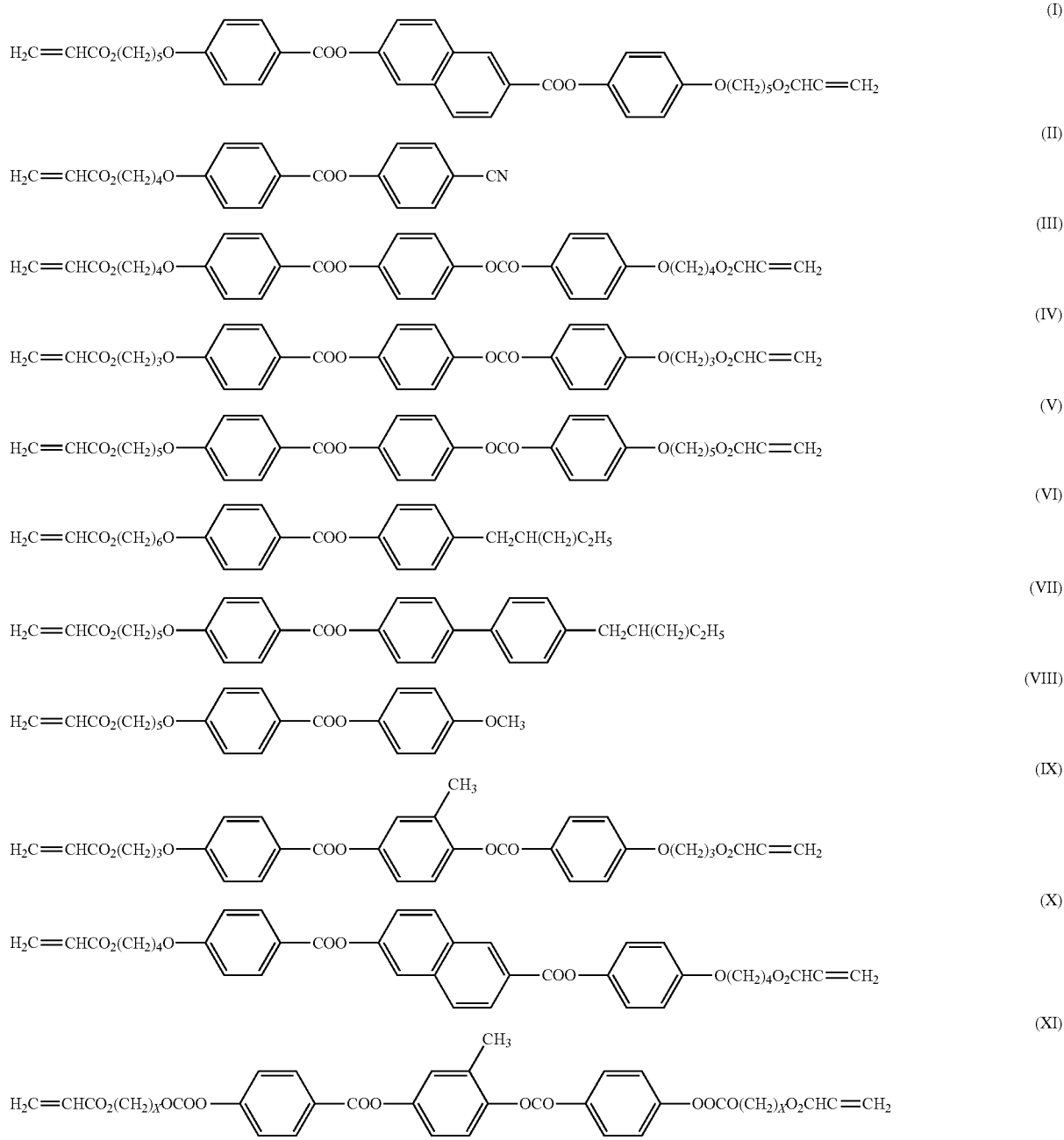

5. The phase difference control component according to claim 4, wherein said phase difference control layer has positive birefringence properties and the optical axis thereof is parallel to the plane of the phase difference control layer and the liquid crystal material comprises one or more of the three-dimensionally crosslinkable compound represented by formulae (I) to (XI).

6. The phase difference control component according to claim 4, wherein said phase difference control layer has positive birefringence properties and the optical axis thereof is parallel to the plane of the phase difference control layer,
the liquid crystal material comprises one or more of the three-dimensionally crosslinkable compound represented by formulae (I) to (XI), and
the retardation value of said phase difference control component representing the level of phase difference, measured by varying the observation angle in the range of −45 degrees to +45 degrees in the slow phase axis direction, is symmetrical with respect to the observation angle.

7. The phase difference control component according to claim 1, wherein the base material comprises triacetylcelluloses.

8. The phase difference control component according to claim 1, wherein the base material comprises triacetylcelluloses,
said phase difference control layer has positive birefringence properties and the optical axis thereof is parallel to the plane of the phase difference control layer.

9. The phase difference control component according to claim 4, wherein said phase difference control layer has positive birefringence properties and the optical axis thereof is parallel to the plane of the phase difference control layer,
the retardation value of said phase difference control component representing the level of phase difference, measured by varying the observation angle in the range of −45 degrees to +45 degrees in the slow phase axis direction, is symmetrical with respect to the observation angle, and
the liquid crystal material comprises one or more of the three-dimensionally crosslinkable compound represented by formulae (I) to (XI).

10. The phase difference control component according to claim 4, wherein the liquid crystal material comprises one or more of the three-dimensionally crosslinkable compound represented by formulae (I) to (XI), and
the base material comprises triacetylcelluloses.

11. The phase difference control component according to claim 4, wherein the phase difference control layer has positive birefringence properties and the optical axis thereof is parallel to the plane of the phase difference control layer,
the liquid crystal material comprises one or more of the three-dimensionally crosslinkable compound represented by formulae (I) to (XI), and
the base material comprises triacetylcelluloses.

12. The phase difference control component according to claim 1, wherein the phase difference control layer has a liquid crystal structure in which liquid crystal molecules, in the direction of the thickness of phase difference control layer, have been aligned at a tilt angle of substantially 0 degree.

13. A process for producing a phase difference control component, comprising a base material and a phase difference control layer formed of a fixed liquid crystal material provided on the base material through a photo-aligned aligning film, the process comprising the steps of:
forming an unaligned aligning film on a base material;
applying polarized light to the unaligned aligning film from the vertical direction to the base material to form a photo-aligned aligning film by a photoalignment method;
providing a liquid crystal material on the photo-aligned aligning film to form a coating film;
aligning the liquid crystal material in such a way that an angle of molecules of the liquid crystal material, present at an interface between the photo-aligned aligning film and the coating film, to the base material in substantially 0 degrees; and
curing the liquid crystal material to form the phase difference control layer,
wherein the photo-aligned aligning film is photodimerization type formed of polyvinyl cinnamate.

14. A liquid crystal display device comprising a phase difference control component, said phase difference control component comprising:
a base material; and
a phase difference control layer formed of a fixed liquid crystal material provided on said base material through a photo-aligned aligning film,
the photo-aligned aligning film being capable to develop a liquid crystal structure in which liquid crystal molecules, present at the interface of the photo-aligned aligning film and the phase difference control layer, have been aligned at a pretilt angle of substantially 0 degree,
wherein the photo-aligned aligning film is formed by irradiating polarized light vertically to the surface of the photo-aligned aligning film, and
wherein the photo-aligned aligning film is photodimerization type formed of polyvinyl cinnamate.

15. The liquid crystal display device according to claim 14, wherein a visual light is obtainable in symmetry with respect to the observation angle.

16. A liquid crystal display device comprising a phase difference control component and a color filter, said phase difference control component comprising:
a base material; and
a phase difference control layer formed of a fixed liquid crystal material provided on said base material through a photo-aligned aligning film,
the photo-aligned aligning film being capable to develop a liquid crystal structure in which liquid crystal molecules, present at the interface of the photo-aligned aligning film and the phase difference control layer, have been aligned at a pretilt angle of substantially 0 degree, and
said phase difference control component being stacked directly on a color filter in such a way that the color filter is disposed against the base material of said phase difference control component,
wherein the photo-aligned aligning film is formed by irradiating polarized light vertically to the surface of the photo-aligned aligning film, and
wherein the photo-aligned aligning film is photodimerization type formed of polyvinyl cinnamate.

* * * * *